(12) United States Patent
Harada

(10) Patent No.: US 11,190,704 B2
(45) Date of Patent: Nov. 30, 2021

(54) IMAGING APPARATUS AND CONTROL METHOD FOR PERFORMING LIVE VIEW DISPLAY OF A TRACKED OBJECT

(71) Applicant: CANON KABUSHIKI KAISHA, Tokyo (JP)

(72) Inventor: Osamu Harada, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/823,159

(22) Filed: Mar. 18, 2020

(65) Prior Publication Data

US 2020/0314318 A1   Oct. 1, 2020

(30) Foreign Application Priority Data

Mar. 29, 2019   (JP) .............................. JP2019-068852

(51) Int. Cl.
*H04N 5/235*   (2006.01)
*H04N 5/225*   (2006.01)
*H04N 5/232*   (2006.01)

(52) U.S. Cl.
CPC ......... *H04N 5/2353* (2013.01); *H04N 5/2258* (2013.01); *H04N 5/23238* (2013.01); *H04N 5/23293* (2013.01); *H04N 5/23296* (2013.01)

(58) Field of Classification Search
CPC ............... H04N 5/2353; H04N 5/2258; H04N 5/23238; H04N 5/23293; H04N 5/23296
See application file for complete search history.

(56) References Cited

U.S. PATENT DOCUMENTS

| | | | | |
|---|---|---|---|---|
| 2002/0180759 A1* | 12/2002 | Park | ..................... | H04N 9/8047 345/629 |
| 2018/0241922 A1* | 8/2018 | Baldwin | ............ | H04N 5/23241 |
| 2019/0098180 A1* | 3/2019 | Tachi | ....................... | H04N 5/04 |

FOREIGN PATENT DOCUMENTS

| | | |
|---|---|---|
| JP | 2012-147082 A | 8/2012 |
| JP | 2016-059061 A | 4/2016 |

* cited by examiner

*Primary Examiner* — Nicholas G Giles
(74) *Attorney, Agent, or Firm* — Canon U.S.A., Inc. IP Division

(57) ABSTRACT

An imaging apparatus including: a main image-capture unit; a sub-image-capture unit including an optical system and an image-capture element different from the main image-capture unit capturing an image of an image capturing range of the main image-capture unit and its peripheral region; and a display unit displaying, during live view, an image from the sub-image-capture unit and a recording region being an image capturing range of the main image-capture unit, wherein when the main object is in the recording region, the exposure of the sub-image-capture unit is controlled based on photometric information in the recording region, meanwhile when the main object is out of the recording region and there is a region including brightness exceeding a predetermined value outside the recording region, the exposure of the sub-image-capture unit is controlled to be reduced by a predetermined value, and an image output from the sub-image-capture unit is displayed in live view.

12 Claims, 4 Drawing Sheets

IMAGING APPARATUS AND CONTROL METHOD FOR PERFORMING LIVE VIEW DISPLAY OF A TRACKED OBJECT

BACKGROUND OF THE INVENTION

Field of the Invention

The present invention relates to an imaging apparatus, in particular, to an imaging apparatus having a plurality of image capture units and a control method therefor.

Description of the Related Art

With an imaging apparatus including a high-magnification zoom lens, since the photographing field angle becomes narrow during telephoto photographing, the main object goes out of the frame from the live view display before photographing due to tilt of the camera caused by slight shake or small motion of the main object. This causes the photographer to recapture the main object out of the field angle within the photographing field angle.

In order to solve such an issue, Japanese Patent Laid-Open No. 2016-59061 discloses a camera including a framing assist function. In Japanese Patent Laid-Open No. 2016-59061, when the photographer loses sight of the main object from the frame during telephoto photographing, the position of the lost main object is verified by pressing a framing assist button to zoom out to the wide-angle side.

Japanese Patent Laid-Open No. 2012-147082 proposes an imaging apparatus including a plurality of imaging elements that perform imaging at different angles of view. With the imaging apparatus disclosed in Japanese Patent Laid-Open No. 2012-147082, when the field angle of an image optical system that performs telephoto imaging is changed, it is possible to support framing by facilitating the user to grasp the main object by controlling the field angle of the image optical system that performs wide-angle imaging.

However, the scheme disclosed in Japanese Patent Laid-Open No, 2016-59061 is a framing operation performed by a single photographic optical system control, where a time lag occurs before photographing, and thus a shutter release opportunity is possibly missed. Furthermore, in the configuration of Japanese Patent Laid-Open No. 2012-147082, when exposure control is performed by each image capture unit, presence of a very bright background other than the main object (tracked object) may saturate the image level of the main object area. In that case, if the main object is present in front of the bright background, visibility deteriorates and the tracking target is lost.

SUMMARY OF THE INVENTION

Hence, the present disclosure is to provide a means capable of performing live view display with visibility of a main object area (tracked object) in an imaging apparatus having a plurality of image capture units.

The present disclosure is characterized by having: a first image capture unit that captures an image at a first field angle; a second image capture unit that captures an image at a second field angle wider than the first field angle including the first field angle; a display unit that displays an image acquired by the second image capture unit; and an exposure control unit that controls exposure of the second image capture unit, wherein the exposure control unit performs control so as to reduce exposure of the second image capture unit when a main object is out of the first field angle and brightness of an image captured by the second image capture unit is higher than a predetermined value.

Further features of the present disclosure will become apparent from the following description of exemplary embodiments (with reference to the attached drawings).

DESCRIPTION OF THE EMBODIMENTS

An exemplary embodiment of the present disclosure will be described in detail below with reference to the accompanying drawings.

It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

First Embodiment

Figure 1:
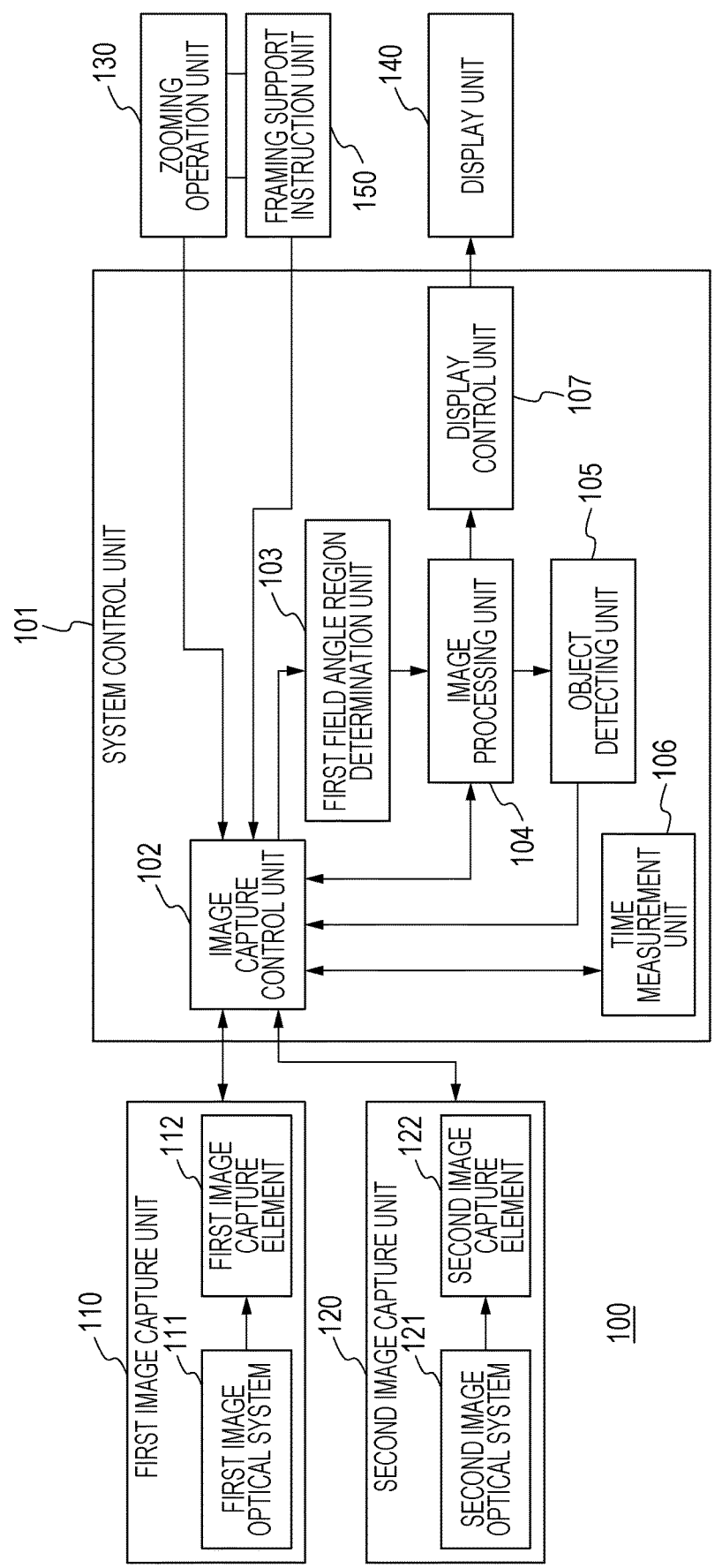
FIG. 1 is a block diagram illustrating a configuration example of an imaging apparatus according to the present disclosure.

FIG. 1 is a block diagram illustrating a configuration example of an imaging apparatus according to the present disclosure. As illustrated in FIG. 1, an imaging apparatus 100 is configured to include a system control unit 101, a first image capture unit 110, a second image capture unit 120, a zooming operation unit 130, a display unit 140, and a framing support instruction unit 150. The first image capture unit 110 and the second image capture unit 120 are installed in the same orientation with respect to the imaging apparatus 100, and the first image capture unit 10 and the second image capture unit 120 can capture an image of the same object.

The first image capture unit 110 includes a first image optical system 111 and a first image capture element 112. The first image optical system 111 includes optical elements such as a zoom lens, a focus lens, and an aperture, and can optically change the zoom magnification of the object image, i.e., change the focal length. The focal length can be changed, for example, by changing the position of the zoom lens in the optical axis direction. The first image optical system 111 can change the focal length regardless of the operation state (imaging or stopping) of the first image capture element 112.

The first image capture element 112 photoelectrically converts the object image that is input via the first image optical system 111 into a digital image signal, and outputs the digital image signal as a first image signal to an image capture control unit 102 included in the system control unit 101. In the present description, the operation from photoelectric conversion to output of an image signal is referred to as an image capturing operation. The image capturing operation by the first image capture element 112 is executed on the basis of an image capturing operation instruction from the image capture control unit 102.

The second image capture unit 120 includes a second image optical system 121 and a second image capture element 122 capable of capturing an image at a wider angle than the wide-angle end of the first image optical system 111. The second image optical system includes optical elements such as a focus lens and an aperture, but the second image optical system 121 of the present embodiment is a single focus optical system and has a focal length shorter than the focal length of the wide-angle end of the first image optical system.

The second image capture element 122 photoelectrically converts the object image that is input via the second image optical system 121 into a digital image signal, and outputs the digital image signal as a second image signal to the image capture control unit 102. The image capturing operation by the second image capture element 122 is also executed on the basis of an image capturing operation instruction from the image capture control unit 102.

It is to be noted that the optical axis of the first image optical system 111 and the optical axis of the second image optical system 121 are parallel, and the relative positional relationship is fixed. Therefore, the position and size of a region of a first image captured by the first image capture unit 110 in a second image captured by the second image capture unit 120 can be acquired from the relationship between the relative position of the optical axes of the first image optical system 111 and the second image optical system 112 and the focal distance.

The zooming operation unit 130 is an operation member for changing the focal length of the first image optical system 111. The focal length of the first image optical system 111 is changed by the image capture control unit 102 controlling, upon receiving an operation of the zooming operation unit 130, the position of the zoom lens constituting the first image optical system 111. In an image picking-up state, when the zooming operation unit 130 is operated by the user, the focal length for preparation of capturing an object image is changed whenever necessary. When the first image capture unit 110 has an electronic zoom function, the zoom magnification is changed without changing the focal length of the first image optical system 111, but the present application treats the electronic zoom is to be also converted into the focal length. For example, when the focal length is 100 mm and the electronic zoom magnification is 2, the focal length is treated as 200 mm.

The display unit 140 performs monitor display by receiving an image signal for display that is generated in the system control unit 101 by performing predetermined signal processing on an image signal acquired by the first image capture unit 110 and the second image capture unit 120, By performing such monitor display during preparation for photographing (before pressing down the release button), the display unit 140 can provide a live-view function for the user to perform framing. Also, the display unit 140 displays an image for confirmation immediately after photographing a still image, user interface information for performing various settings, and the like.

Next, the functional configuration of the system control unit 101 will be described. As illustrated in FIG. 1 the system control unit 101 is configured to include the image capture control unit 102, a first field angle region determination unit 103, an image processing unit 104, an object detecting unit 105, a time measurement unit 106, and a display control unit 107. In addition, the system control unit 101 includes a CPU and a memory that are not illustrated.

By appropriately executing a program stored in the memory, the CPU of the system control unit 101 controls the processing of each unit of the imaging apparatus 100, and realizes various functions.

The image capture control unit 102 controls optical elements constituting the first image optical system 111 and the second image optical system 121, and controls image capturing operations by the first image capture element 112 and the second image capture element 122, thereby controlling the photographing process by the first image capture unit 110 and the second image capture unit 120. In the present embodiment, an image captured by the first image capture unit 110 in response to an imaging instruction is recorded as a recorded image.

The image capture control unit 102 controls the position of the zoom lens constituting the first image optical system 111 such that the focal length of the first image optical system 111 becomes the focal length instructed by the zooming operation unit 130, In addition, the image capture control unit 102 outputs, to the first image region determination unit 103, information regarding the current field angle of the current first image optical system 111. It is to be noted that the information regarding field angle is only required to be any information that can unambiguously provide the field angle, and the information regarding field angle may be the field angle itself, or may be information such as the focal length, the zoom magnification, and the position of the zoom lens. The change of the focal length and the output of the information regarding the held angle are executed whenever necessary in response to the user operation on the zooming operation unit 130. In addition, the image capture control unit 102 can change whenever necessary an imaging parameter of the first image capture unit 110 on the basis of an evaluation value of the image fed back from the image processing unit 104. Then, a first image signal imaged by the first image capture unit 110 and a second image signal imaged by the second image capture unit 120 are output to the image processing unit 104.

When the user operates a photographing execution instruction member (so-called release button) to instruct a photographing execution, the image capture control unit 102 causes the first image capture unit 110 to execute an image capturing operation, and the captured still image or moving image data is recorded in an unillustrated recording unit.

The first image region determination unit 103 determines the position and size of a region in the second image corresponding to the first image (which may be simply referred to as the first image region). The size of the region corresponding to the first image can be acquired from the relationship between the focal lengths of the current first image optical system 111 and the second image optical system 121. For example, if conditions other than the focal length are the same, when the focal length of the first image optical system 111 is ten times the focal length of the second image optical system 112, the size of the region in the second image corresponding to the first image is ¹⁄₁₀ of the entire second image both vertically and horizontally. The center position of the region corresponding to the first image is determined by the relative position between the first image optical system 111 and the second image optical system 112. In the cause of the present embodiment, since the relative position is fixed, the center position of the region in the second image corresponding to the first image is constant. The center position and information regarding the focal length of the second image optical system 121 can also be recorded in an unillustrated recording unit. In this case, the first image region determination unit 103 reads out the center position information and information regarding the field angle of the second image optical system 121 from the recording unit. Then, on the basis of the information read out and the information regarding the field angle of the first image optical system 111 received from the image capture control unit 102, the region in the second image corresponding to the first image can be determined. It is to be noted that the information regarding the field angle of the second image optical system 121 may also be acquired from the image capture control unit 102 in the same manner as the information regarding the field angle of the first image optical system 111.

The first image region determination unit 103 outputs information regarding the position and size of the determined first field angle to the image processing unit 104.

On the first image having been output from the first image capture element 112 and the second image having been output from the second image capture element 122, the image processing unit 104 executes processing such as gamma/knee processing, filter processing, and image processing of hardware. The image signal treated with the image processing is output to the object detecting unit 105.

By performing predetermined signal processing on the images acquired by the first image capture unit 110 and the second image capture unit 120, the image processing unit 104 generates an image signal for display. For example, the image processing unit 104 generates an image signal for display in which a shooting region (recording region) of the first image capture element 112 is superimposed as a recording region frame on an image having been output from the second image capture element 122. Furthermore, for example, the image processing unit 104 generates an image signal for display by synthesizing an image having been output from the first image capture element 112 with a part of the image signal having been output from the second image capture element 122. The image based on the image signal for display generated at this time will be described later with reference to FIGS. 2A to 2D. The generated image signal for display is output to the display control unit 107, and is displayed on the display unit 140 via the display control unit 107.

Furthermore, the image processing unit 104 performs photometry evaluation from brightness intensity, distribution, and the like within an image capturing range on the basis of image data acquired from the first image capture unit 110 and the second image capture unit 120. For example, the image processing unit 104 calculates the exposure evaluation value and feeds back it to the image capture control unit 102, and on the basis of the result, the image capture control unit 102 controls the exposure of the first image capture unit 110 and the second image capture unit 120. As the exposure evaluation value, for example, the number or ratio of pixels in which the gradation information is lost (overexposure, underexposure), the mode value, mean value, or median value of the luminance (brightness) histogram of the image can be used. The image processing unit 104 can acquire an exposure evaluation value of the entire second image and an exposure evaluation value of a region corresponding to the first image. Furthermore, the image processing unit 104 may be configured to perform the focus evaluation by, for example, the contrast autofocus (AF) and the phase difference method that is carried out by dividing each pixel in the image capture elements into two and configuring micro lenses each of which forms an independent optical path. In addition, the image processing unit 104 calculates various evaluation values of the first image and the second image and feeds back them to the image capture control unit 102. On the basis of these evaluation values, the image capture control unit 102 performs shooting control by setting imaging parameters such as exposure control and AF control of the first image capture unit 110 and the second image capture unit 120.

On the basis of the data of the first image and the second image processed by the image processing unit 104, the object detecting unit 105 detects the moving state and the object type of the main object (tracked object) within the respective field angles. These are detected on the basis of an image output from the first image capture element 112 or the second image capture element 122 by, for example, a face recognition function of a person, an object position and velocity detection by distance measurement, a feature extraction function of the object in response to a user operation for the display unit 140 during live view, and the like. The main object captured by the object detecting unit 105 is tracked to perform determination as to whether the position where the main object of the tracking target exists is inside or outside the recording area (imaging region by the first image capture unit 110) and prediction of the destination of the main object.

The time measurement unit 106 measures the duration time of the image capturing operation state of the first image capture unit 110 from the timing when the image capture control unit 102 starts the image capturing operation state of the first image capture unit 110. Furthermore, when it is detected as a result of the measurement that the duration time of the image capturing operation state has become equal to or longer than a predetermined length of time, a duration time lapse signal of the image capturing operation is output to the image capture control unit 102.

Figure 2A:
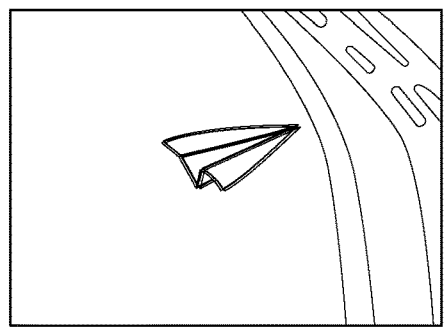
FIGS. 2A to 2D are examples of live view display at the time of telephoto support according to the present disclosure.

Next, a telephoto support (framing assistance) control operation according to the present embodiment will be described with reference to FIGS. 2A to 2D. FIGS. 2A to 2D are an example of live view display of an image captured by the first image capture unit 110 and the second image capture unit 120 at the time of telephoto support according to the present disclosure. This is a display example when a main object 91 is being tracked, and photographing support is provided such that the main object 91 can be framed in a recording region by displaying a recording region frame 92. FIG. 2A is a display example at the time of normal image capturing in the imaging apparatus 100, and an image having been output from the main image capture unit (first image capture element 112) is displayed on the entire display screen. At this time, image capturing by the second image capture unit 120 is unnecessary.

Figure 2B:
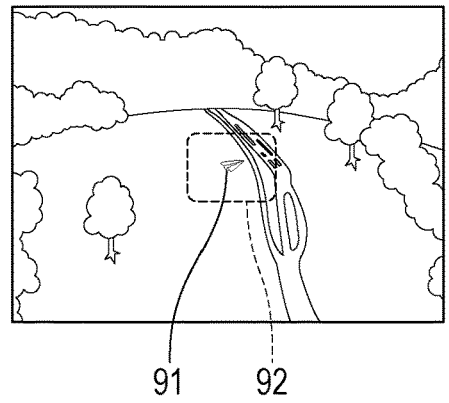
Figure 2C:
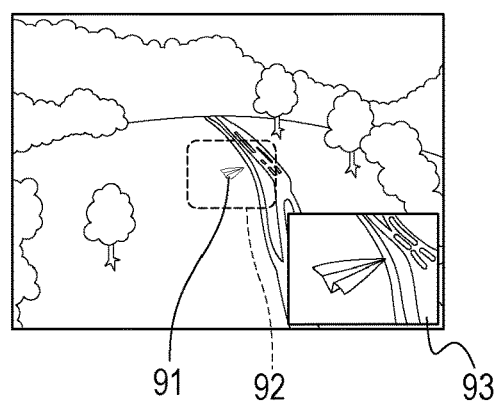

When in the telephoto support (framing assistance) state, first, the second image capture unit 120 is started up, and the second image optical system 121 and the second image capture element 122 are controlled to generate a live view display image for telephoto support. Examples thereof are illustrated in FIGS. 2B and 2C. For an image signal having been input from the second image capture unit 120, the first image region determination unit 103 calculates the position of the field angle of the first image capture unit 110. The display unit 140 displays the output image of the second image capture element 122 synthesized with the recording region frame 92, which is a frame indicating the position and size of the calculated region.

In FIG. 2B, an image acquired from the second image capture element 122 is displayed as a reference region on the entire display screen, and the recording region frame 92 indicting a recording region that is the image capturing range of the main image capture unit (first image capture unit 110) is displayed. In FIG. 2C, the entire image having been output from the second image capture element 122 is synthesized with an image that is output from the first image capture element 112 and displayed in a recording region 93, which is a predetermined display region on the display screen.

Figure 2D:
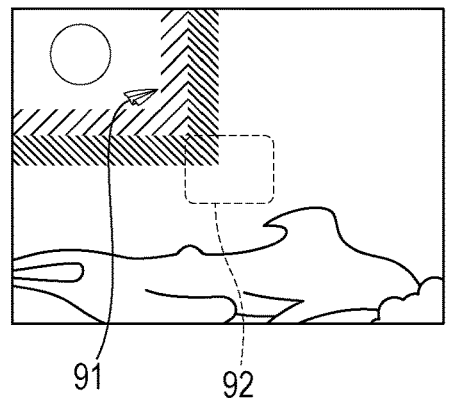

In FIG. 2D, a sub-image (image having been output from the second image capture element 122) is displayed on the entire screen as in FIG. 2B and FIG. 2C, and a recording region by the main image capture unit (first image capture unit 110) is indicated by the recording region frame 92. However, in this example, the main image capture unit (first image capture unit 110) does not capture the main object 91, and in this case, it is not possible to photograph (record) the main object. The user photographs the main object 91 captured within the image capturing range of the main image capture unit (first image capture unit 110) by performing operations of the camera orientation or zooming such that the main object 91 is in the recording region frame 92.

As a condition in which the imaging apparatus 100 transitions from the normal shooting state to the telephoto support state, in the present embodiment, a case where the focal length of the first image optical system 111 exceeds a predetermined value will be described as an example. For example, when the user sets the focal length of the first image optical system 111 to a predetermined value or greater by operating the zooming operation unit 130, the image capture control unit 102 starts up the second image capture unit 120 and the imaging apparatus 100 enters the telephoto support state. Furthermore, the display unit 140 performs a live view display of an image acquired from the output of the second image capture element 122 when in the telephoto support state, and performs a live view display of an image acquired from the output of the first image capture element 112 when the focal length of the first image optical system 111 is shorter than a predetermined value.

It is to be noted that the conditions for starting the telephoto support are not limited to this, and a transition may be made according to the focal length of the first image optical system 111 only when switching of valid/invalid of the telephoto support is enabled and the telephoto support is made valid by the user operation. In addition, the switching point of the focal length of the first image optical system 111 at which a transition is made to the telephoto support may be a fixed predetermined value or may be variable depending on the moving velocity of the main object and the tracking velocity of the imaging apparatus of the photographer. Furthermore, the telephoto support state may be set in response to a user operation, for example, only while the operation of the framing support instruction unit 150 such as a framing assist button is continued.

Here, when the main object 91 is within the recording region, the second image capture unit 120 (sub image capture unit) is subjected to exposure control such that the inside of the recording region is properly exposed, and the image having been output from the second image capture element 122 is displayed as a live view image. When exposure control is performed over the entire image pickup range of the second image capture unit 120, which is at a wider angle than the first image capture unit 110, the degree of influence of the photometric value outside the recording region frame 92 increases when the outside of the recording region frame 92 is in a very bright or dark state than the inside of the recording region frame 92. As a result, the inside of the recording region frame 92 is not optimally exposed and visibility is deteriorated, and hence exposure control in accordance with the recording region frame 92 corresponding to the recording region of the main image capture unit (first image capture unit 110) is desirable.

However, since the region corresponding to the recording region frame 92 on the second image capture element 122 is controlled so as to be properly exposed, if a very bright background exists outside the recording region frame 92, for example, as illustrated in FIG. 2D, the image level (luminance level) outside the recording region may be saturated. Therefore, it is necessary to perform appropriate exposure control such that the tracking target can be tracked without deteriorating the visibility even when the main object 91 is out of the recording region frame 92 and is present in front of a very bright background.

Therefore, in the present embodiment, the evaluation frame of the exposure control is switched according to whether or not the main object is captured in the recording region. First, on the basis of the output from the second image capture element 122, when the main object 91 is in the recording region frame 92 as illustrated in FIGS. 2B and 2C, the brightness state in the region corresponding to the recording region frame 92 is evaluated by the image processing unit 104. By determining the exposure condition such that the region of the recording region frame 92 has a proper brightness on the basis of the evaluation value, exposure control is performed such that the main object 91 captured in the recording region frame 92 has a proper brightness. On the other hand, when the main object 91 exists outside the recording region frame 92 as illustrated in FIG. 2D, the brightness state outside the recording region frame 92 is evaluated by the image processing unit 104, and the exposure condition is determined so as to achieve a brightness with which the user can visually recognize the main object 91 on the live view display.

Figure 3:
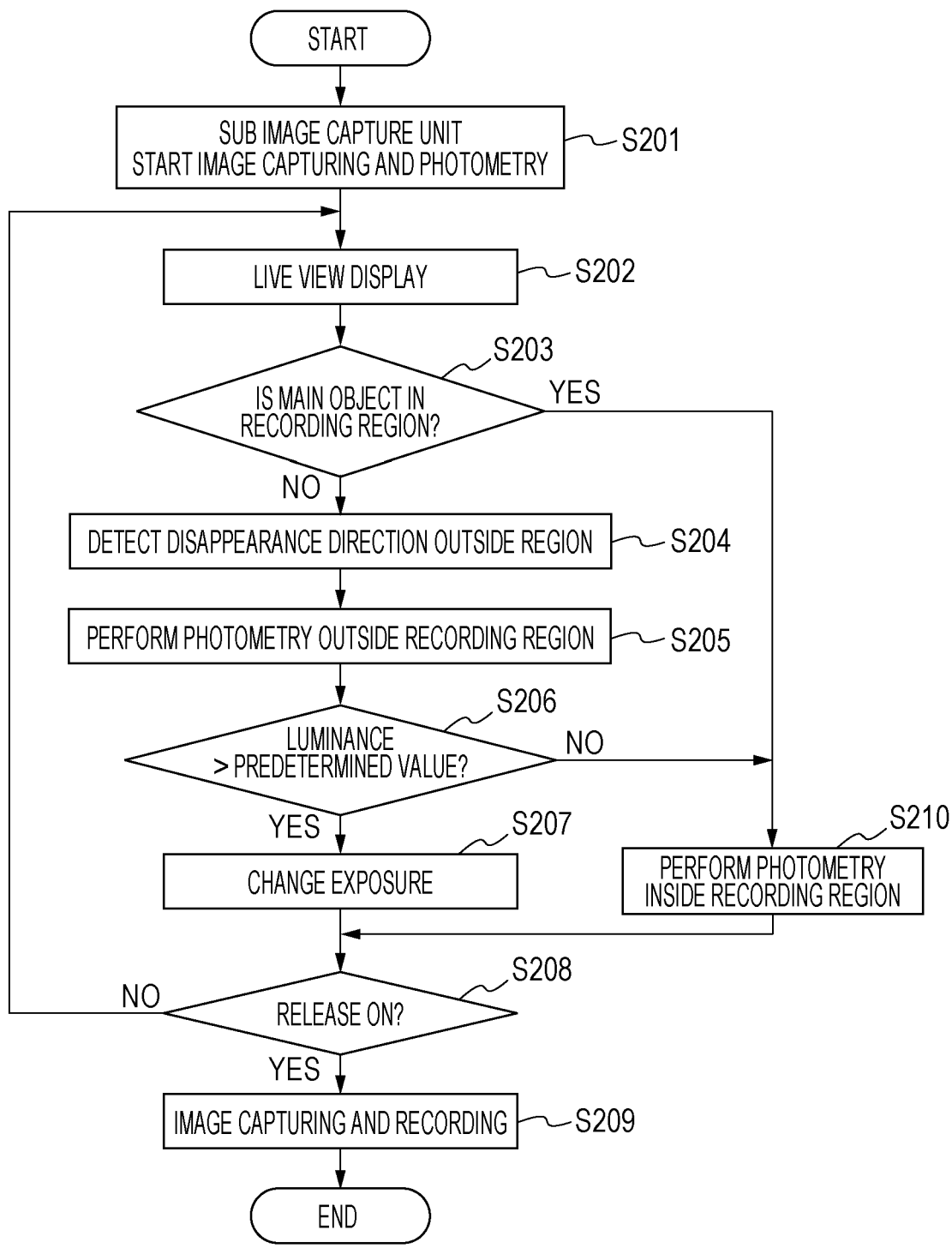
FIG. 3 is a flowchart presenting exposure control at the time of telephoto support of an imaging apparatus according to a first embodiment of the present disclosure.

Next, the exposure control in the telephoto support according to the first embodiment of the present disclosure will be described with reference to the flowchart of FIG. 3. FIG. 3 is flowchart presenting exposure control at the time of telephoto support (framing support) of the imaging apparatus according to a first embodiment of the present disclosure, and the operation of the imaging apparatus 100 after the transition from the normal shooting state to the telephoto support state will be described, Each processing presented in FIG. 3 is achieved by the system control unit 101 by controlling and executing each processing block and by developing and executing a program stored in the memory (not illustrated) that the system control unit 101 has. Upon inputting an imaging instruction, each step is stopped, and the main shooting operation by the first image capture element 112 is started. In the main shooting operation, processing is performed in which an image is captured with an exposure time determined by the AE processing, and the obtained image signal is recorded on a recording medium. The imaging instruction may be input from the user by pressing down an unillustrated shutter button, or the system control unit 101 may automatically generate the imaging instruction when in the auto photographing mode and input it to the image capture control unit 102.

It is to be noted that in the first embodiment, the moving state of the main object 91 in the field angle is based on the moving direction and velocity of the main object 91 and the moving direction and velocity of the imaging apparatus when the photographer tracks the main object. The moving direction and velocity of the imaging apparatus 100 can be acquired by, for example, an angular velocity sensor (not illustrated). When the imaging apparatus 100 transitions to the telephoto support state, the present flowchart starts.

First, in step S201, image capturing is performed by the second image capture unit 120, and the system control unit 101 acquires an image from the second image capture element 122. On the basis of the received image, exposure control corresponding to the telephoto support state by the image processing unit 104 and the image capture control unit 102 is started.

The flow of processing proceeds to step S202, where a live view display image corresponding to the telephoto support state is generated from the images having been output from the first image capture element 112 and the second image capture element 122, and the generated display image is displayed on the display unit 140.

In step S203, the object detecting unit 105 determines as to whether or not the main object 91 exists in the recording region. The flow of processing proceeds to step S204 if the main object is outside the recording region and does not exist in the recording region, meanwhile the flow of processing proceeds to step S210 if the main object exists in the recording region. It is to be noted that the determination as to whether or not the main object 91 exists in the recording region can be detected using either the output of the first image capture element 112 or the output of the second image capture element 122. In addition, for example, when the user operates with the framing support instruction unit 150 such as the framing assist button, the main object may be determined to be outside the recording region (not present in the recording region).

When the main object does not exist in the recording region, the object detecting unit 105 detects in step S204 the direction in which the main object 91 has disappeared from the recording region frame 92. At this time, any means may be used as long as the moving direction of the main object can be detected. The moving direction may be detected on the basis of a prediction from a past image having been output by the first image capture element 112, or may be detected from the entire second image having been output by the second image capture element 122. The moving direction may be detected by an external sensor.

In step S205, on the basis of the detection result in step S204, the image processing unit 104 performs photometry with the evaluation region changed to a region corresponding to the direction in which the main object 91 has disappeared. Alternatively, photometry may be performed with the evaluation region expanded.

In step S206, on the basis of the evaluation value of the photometry in step S205, it is determined as to whether or not the image luminance is higher than a predetermined value. The flow of processing proceeds to step S207 if the image luminance is higher than the predetermined value (Yes), meanwhile the flow of processing proceeds to step S210 if it is equal to or lower than the predetermined value (No). Here, the predetermined value of luminance is, for example, a luminance level at which the background level on the live view display is around the saturation level and the visibility of the main object cannot be guaranteed when the luminance of the live view display exceeds the predetermined value. The predetermined value of luminance may be a design value calculated by actual measurement or the like. Whether the brightness is higher than a predetermined value is determined, for example, based on whether the maximum luminance level or the average luminance level in the evaluation region is higher than the predetermined value. Alternatively, the determination may be made based on, for example, whether the number of pixels having a luminance level higher than a predetermined luminance level in the evaluation region or the ratio of the number of those pixels are larger than the predetermined value, and the like.

In step S207, the image capture control unit 102 changes the exposure parameter of the second image capture unit 120 such that the exposure is lower than the current exposure level. The change value is a value obtained by an experiment or a value calculated on the basis of the photometry result in step S205, and it may be any value as long as the visibility of the main object on the live view display is guaranteed. Thereafter, the flow of processing proceeds to step S208.

On the other hand, if it is determined in step S203 that the main object exists in the recording region (Yes), or if the luminance of the image is equal to or lower than a predetermined value in step S206, the flow of processing proceeds to step S210. In step S210, the image processing unit 104 performs photometry of a region corresponding to a recording region (image capturing range by the first image capture unit 110) of the image having been output by the second image capture element 122. If the main object exists in the recording region (Yes in step S203), proper exposure control for the main object is possible by performing photometry in a region corresponding to the recording region. Furthermore, if the image luminance is equal to or lower than a predetermined value even if the main object is outside the recording region (No in step S207), it can be determined that the background level on the live view display is not at the saturation level and the visibility of the main object can be guaranteed. Also in this case, the image processing unit 104 performs photometry of a region corresponding to the recording region without changing the photometry area. Thereafter, the flow of processing proceeds to step S208, where the photographer is in the release standby state.

In step S208, the photographer is in the release operation standby state, and it is determined as to whether or not a release operation (imaging instruction) has been made. The flow of processing proceeds to step S209 if the photographer performs the release operation (ON), and the flow of processing returns to the operation of step S202 if the photographer does not perform the release operation (OFF).

In step S209, in response to the release operation by the photographer, the system control unit 101 executes the shooting operation in the first image capture unit 110 (main image capture unit), the acquired image is recorded in an unillustrated recording medium, and the flow of processing ends. At this time, the acquired image is displayed on the display unit 140 as a confirmation image. It is to be noted that, even after the photographing and recording are executed, the exposure control of the present flowchart is continued repeatedly as long as the telephoto support state continues.

As described above, when the main object at the e of telephoto support is out of the recording region, the imaging apparatus of the first embodiment executes exposure control on the basis of the photometry result outside the recording region. When the brightness of a live view image exceeds a predetermined value, the exposure of the second image capture element 122 is lowered to be reflected on the live view display. Thus, even if the bright background object and the main object overlap, the visibility of the main object is guaranteed by lowering the exposure of the entire image, and the photographer can continue tracking without losing the main object. It is to be noted that while the case where the peripheral region is so bright that the luminance is saturated (overexposure) has been described in the present embodiment, it is also applicable to the case where the peripheral region is too dark and gradation is lost (underexposure). In this case, the exposure of the second image capture unit 120 is controlled to increase when the luminance level of the pixel is lower than a predetermined value, or when the image is determined to be too dark on the basis of the number of underexposed pixels or the ratio of the number of those pixels, for example.

It is to be noted that while in step S205, photometry is performed on the region outside the recording region corresponding to the direction in which the main object has disappeared, the photometry operation is not limited to this, the detection of the direction of disappearance (step S204) may be omitted, photometry may be performed over the entire region outside the recording region, and the flow of processing may move on to brightness determination. At this time, photometry may be performed over an evaluation region including the recording region.

In addition, even if the main object is outside the recording region, when the object detecting unit 105 predicts the moving state of the main Object within the field angle, and the prediction result indicates that the main object frequently moves in and out of the recording region in a short period of time, exposure control may be performed on the basis of the result of photometry performed within the recording region. It is thus possible to suppress the visibility from deteriorating caused by flickering of the live view due to switching of the exposure value each time the main object moves in and out of the recording region.

Furthermore, while in the present embodiment, the determination as to which region outside the recording region is to perform photometry when the main object disappears from the recording region is made as to the direction in which the main object has disappeared from the recording region, the way to determine the region to be subjected to photometry is not limited thereto. For example, the object detecting unit 105 may predict the position at which the main object exists in the next frame display screen of the live view on the basis of the moving direction and velocity of the main object in the live view display screen, and may perform exposure control, as a photometric target, over a region including this position. This allows an image whose exposure is appropriately controlled to be synchronized with the live view display.

Second Embodiment

In order to improve visibility on a live view display even when the main object disappeared from the outside of the recording region is in front of a background brighter than a predetermined value at the time of telephoto support, the exposure of the second image capture element 122 is reduced in the first embodiment. However, in this case, since the original brightness of the background cannot be known, visibility on the live view display is guaranteed, but the exposure condition may not be optimal. Furthermore, even if the first image capture element 112 is originally large in size, in order to optimize the size of the external form of the imaging apparatus 100, it is desirable to make the sub second image capture element 122 smaller in external form than the main sensor, and the pixel size also becomes smaller. As a result, the second image capture element 122, which is the sub-sensor, is narrower in dynamic range than the first image capture element 112, and the second image capture element 122 becomes more likely to be saturated.

Therefore, in the second embodiment, by controlling the main first image capture unit 110 having a wider dynamic range, exposure control that improves the visibility of the main object on live view display at the time of telephoto support is achieved.

Figure 4:
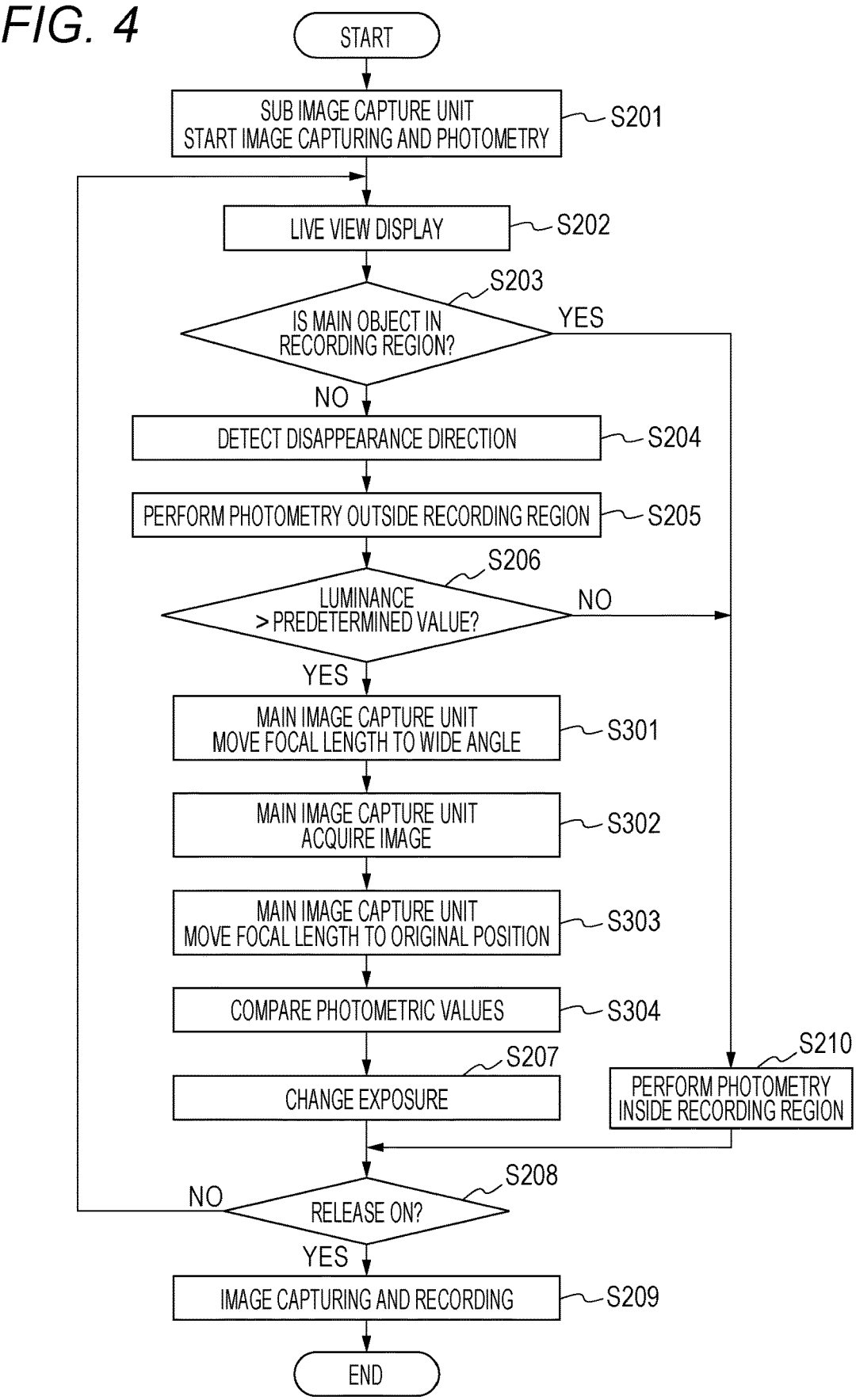
FIG. 4 is a flowchart presenting exposure control at the time of telephoto support of an imaging apparatus according to a second embodiment of the present disclosure.

Hereinafter, the operation of the imaging apparatus according to the second embodiment of the present disclosure will be described with reference to the flowchart of FIG. 4. FIG. 4 is a flowchart presenting exposure control at the time of telephoto support (framing support) of the imaging apparatus according to the second embodiment of the present disclosure. Each processing presented in FIG. 4 is achieved by the system control unit 101 by controlling and executing each processing block and by developing and executing a program stored in the memory (not illustrated) that the system control unit 101 has. Since the operation in FIG. 4 is a modification based on the operation in FIG. 3, the common operations in the figures are denoted by the same reference numerals, and the description thereof is omitted. When the imaging apparatus 100 transitions to the telephoto support state, the present flowchart starts. The processing from step S201 to step S206 is the same as that in FIG. 3. The difference from the flowchart of FIG. 3 described in the first embodiment is a portion of control after the brightness is determined to have exceeded the predetermined value in the brightness determination of step S206.

If it is determined in step S206 that the luminance of the image is higher than a predetermined value, i.e., if the main object is out of the recording region and the luminance outside the recording region exceeds a predetermined value, the flow of processing proceeds to step S301, where the focal length of the first image capture unit 110 is moved to a wide angle, That is, the field angle is controlled such that the image capturing range (recording region) of the first image capture unit 110 becomes the same as that of the second image capture unit 120. In this state, since the main object is out of the recording region and photographing and recording by the first image capture unit 110, which is main, is not executed, moving the focal length to the wide angle side does not hinder photographing. It is to be noted that while in the present embodiment, the focal length of the first image capture unit 110 is moved to become the same as that of the second image capture unit 120, the present disclosure is not limited to this, and the focal length of the first image capture unit 110 may not be the same as that of the second image capture unit 120 as long as the main object is within the screen.

Next, in step S302, an image is acquired from the first image capture element 112 for performing photometry.

Thereafter, the flow of processing proceeds to step S303, where the focal length of the first image capture unit 110 is immediately returned to the original position (position before execution of step S301). Here, the exposure of the first image capture element 112 at the time of image acquisition is controlled by calculating exposure conditions such that there is no saturated portion within the image capturing range in the image processing unit 104 and the image capture control unit 102.

In step S304, on the basis of the image acquired in step S302, the image processing unit 104 obtains the photometric values of the region corresponding to the recording region, the main object, and its peripheral region, and calculates the ratio thereof. From this calculated value, the exposure condition of the second image capture element 122 is determined and the exposure is changed (step S207).

As described above, the imaging apparatus of the second embodiment controls the exposure of the second image capture element 122 on the basis of the photometry value when the focal length of the first image capture unit 110 is made wide. This allows a control such that the main object is properly exposed even when the main object at the time of telephoto support is out of the recording region frame and there is a bright background exceeding a predetermined value outside the recording region frame. In particular, when a region having a bright background is saturated with the second image capture element 122, a more accurate exposure value can be calculated by performing photometry using the first image capture element 112 having a wider dynamic range. As a result, the visibility of the main object on the live view display can be achieved under an optimum exposure condition in a short period of time.

While the above is the description of the preferred embodiments of the present invention, the present invention is not limited to the above embodiments, and should be changed and applied appropriately in accordance with the target circuit configuration, within the scope of the technical idea of the present invention. For example, the imaging apparatus described in the above embodiments can be applied to a digital still camera and a digital video camera.

In addition, the present invention can be achieved as embodiments as, for example, a system, a device, a method, a computer program, a recording medium, or the like, and may be achieved by a single device or may be applied to a system including a plurality of devices. Each unit constituting the imaging apparatus according to the present embodiment and each step of the control method of the imaging apparatus can also be achieved by an operation of a program stored in a memory of a computer or the like. This computer program and a computer-readable recording medium on which this program is recorded are included in the present invention.

The present invention can also be achieved by processing in which a program that achieves one or more of the functions of the above-described embodiments is supplied to a system or a device via a network or a storage medium, and one or more processors in the computer of the system or the device read and execute the program. Furthermore, it can also be achieved by a circuit (e.g., an ASIC) that achieves one or more functions.

According to the present disclosure, live view display with visibility of a main object region (tracked object) can be performed in an imaging apparatus having a plurality of image capture units.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-068852, filed Mar. 29, 2019, which is hereby incorporated by reference herein in its entirety.

What is claimed is:

1. An imaging apparatus, comprising:
a processor programmed to operate as the following units;
a first image capture unit configured to capture an image at a first field angle;
a second image capture unit configured to capture an image at a second field angle wider than the first field angle including the first field angle;
an exposure control unit configured to have a first exposure mode that controls exposure of the second image capture unit based on a luminance of a region in the first field angle, and a second exposure mode that changes exposure of the second image capture unit based on a luminance of a region in the second field angle including outside of the first field angle when a main object is outside the first field angle; and
a display control unit configured to cause the image captured by the second image capture unit to be displayed.

2. The imaging apparatus according to claim 1, the processor further programmed to operate as a recording unit configured to record, as a recorded image, the image in the first field angle captured by the first image capture unit.

3. The imaging apparatus according to claim 1, wherein the display control unit superimposes and displays a frame indicating the first field angle on the image captured by the second image capture unit during live view.

4. The imaging apparatus according to claim 1, wherein the exposure control unit executes change in exposure of the second image capture unit in the second exposure mode when a luminance level of the region in the second field angle is higher than a predetermined value.

5. The imaging apparatus according to claim 1, wherein the processor is further programmed to operate as a detection unit configured to be capable of detecting a position and motion of the main object,
wherein the detection unit detects a direction in which the main object is out of the first field angle, and
the exposure control unit executes change in exposure of the second image capture unit by the second exposure mode when a region whose luminance level is higher than a predetermined value exists in the direction detected by the detection unit in the region outside the first field angle.

6. The imaging apparatus according to claim 5, wherein the detection unit predicts a position of the main object when a next frame is displayed from the direction and a velocity of the main object in which the main object disappears from the first field angle, and
the exposure control unit executes change in exposure of the second image capture unit by the second exposure mode when the luminance level of the region including the predicted position is higher than the predetermined value.

7. The imaging apparatus according to claim 1, wherein when the main object repeats moving in and out of the first field angle,
the exposure control unit does not execute change in exposure of the second image capture unit in the second exposure mode.

8. The imaging apparatus according to claim 1, wherein the exposure control unit executes exposure control of the second image capture unit in the first and second exposure modes when the apparatus is in a telephoto support state.

9. A control method for an imaging apparatus having
a first image capture unit configured to capture an image at a first field angle; and
a second image capture unit configured to capture an image at a second field angle wider than the first field angle including the first field angle, the control method comprising:
a step of controlling exposure of the second image capture unit based on a luminance level in the first field angle;
a step of changing exposure of the second image capture unit on a basis of a luminance level in the second field angle including out of the first field angle when the main object is out of the first field angle; and
a step of causing an image captured by the second image capture unit to be displayed.

10. The control method according to claim 9, further comprising a step of recording, as a recorded image, the image captured by the first image capture unit.

11. The control method according to claim 9, comprising a step of superimposing and displaying a frame indicating the first field angle on the image acquired by the second image capture unit during live view.

12. A non-transitory computer-readable storage medium that stores a program, wherein the program causes a computer to execute a control method of an imaging apparatus that includes a first image capture unit configured to capture an image at a first field angle and a second image capture unit configured to capture an image at a second field angle wilder than the first field angle including the first field angle, the control method comprising:
a step of controlling exposure of the second image capture unit based on a luminance level in the first field angle;
a step of changing exposure of the second image capture unit on a basis of a luminance level in the second field angle including out of the first field angle when the main object is out of the first field angle; and
a step of causing an image captured by the second image capture unit to be displayed.

* * * * *